Jan. 12, 1965 V. L. CARISSIMI ETAL 3,165,614

WIRING DEVICE AND WIRE ENGAGEMENT MEANS THEREFOR

Original Filed Jan. 28, 1955 2 Sheets-Sheet 1

WITNESSES

John E. Healy, Jr.

Zigmund L. Jermer

INVENTORS
Vincent L. Carissimi
& Owen L. Taylor
BY
Donald G. Smith
ATTORNEY

WIRING DEVICE AND WIRE ENGAGEMENT MEANS THEREFOR

United States Patent Office 3,165,614

Patented Jan. 12, 1965

3,165,614

WIRING DEVICE AND WIRE ENGAGEMENT MEANS THEREFOR

Vincent L. Carissimi, Fairfield, and Owen L. Taylor, Easton, Conn., assignors, by mesne assignments, to Westinghouse Electric Corporation, a corporation of Pennsylvania Continuation of application Ser. No. 484,811, Jan. 28, 1955. This application Dec. 23, 1958, Ser. No. 782,583

10 Claims. (Cl. 200—166)

Our invention relates to a new and improved wiring device and, more particularly, to a new and improved electric switch having novel features of construction, whereby the switch may be produced at a low cost.

This application is a continuation of our copending application entitled "Wiring Device," Serial No. 484,811 and filed January 28, 1955.

As can readily be appreciated in marketing switches for use in low voltage circuits, such as the ordinary household circuit, the price of the device and its adaptability for the service are important considerations with the purchaser. In view of these considerations, we have designed a new and improved switch which incorporates several desirable service features, yet which can be produced at a low cost. One important consideration is the noise level of the switch during the switching operation. Some prior devices have been constructed to minimize or eliminate such noise by using a switch handle mounted in a resilient material such as rubber, or have resorted to using globules of liquid conducting material such as mercury. Each of these types of switches has entailed additional expense to eliminate the switch noise. Also, in such devices the use of screwless terminals is desirable in view of the reduced installation time required. Some prior screwless terminals have required separate means for engaging various sizes of inserted conductors which requires an elongated terminal which when assembled in a switch makes the completed assembly too large to be located in a standard outlet box. Still other prior devices have employed various electrical and switch components located within the switch which are joined together by various fastening and connecting means, which has added materially to the cost of the device.

Accordingly, one object of our invention is to provide a new and improved wiring device of simplified construction.

Another object of our invention is to provide a new and improved wiring device which may be produced at a low cost and which incorporates various desirable features.

Another object of our invention is to provide a new and improved wiring device having new and improved screwless terminals located therein which includes a movable wire engaging means incorporating integral means to prevent overstressing the wire engaging means.

Another object of our invention is to provide a new and improved screwless terminal for switch which also carries the switch contacts.

A more specific object of our invention is to provide a new and improved wiring device having a movable jaw located adjacent a wire guide, whereby wiring connections may easily be made by inserting various sizes of electrical conductors into the wire guide and past the jaw, yet which may easily be released.

These and other objects of our invention will become more apparent when taken in conjunction with the following drawings and detailed description of a preferred embodiment thereof, in which.

Figure 1:
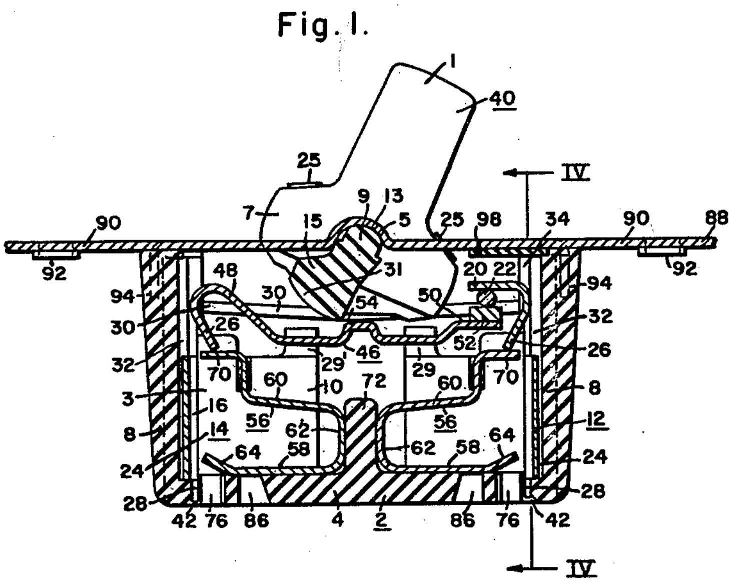
FIGURE 1 is a longitudinal cross-sectional view of a wiring device constructed in accordance with the principles of our invention taken on a plane displaced to one side of the longitudinal center line of the device as shown by the line I—I in FIG. 4.

Referring to the drawings it will be noted that the various features of our invention are shown embodied in an electrical switch. Such illustration is for convenience only in describing the various features of our invention, and, as will become more apparent from the following description, some features of the switch are readily adaptable for use in other types of wiring devices.

As shown in FIGURES 1 to 4 a switch constructed in accordance with the principles of our invention has a formed dish-shaped housing 2, which is fabricated from any suitable insulating material, such as molded plastic material, which may readily be constructed with the various structural components as hereinafter described. The housing 2 comprises an approximately rectangular base 4 having a pair of upwardly extending side walls 6 at its outer side edges which are joined together by upwardly extending end walls 8 at each end of the base 4. A pair of longitudinally extending spaced barriers 10 are provided on the longitudinal center line of the housing 2 which are formed integral with the base 4 and one of the end walls 8 of the housing 2, so as to divide the housing 2 into two longitudinally extending chambers 3 and 3' on opposite sides of the barriers 10. In the switch shown, only the chamber 3 is utilized for receiving switching means, however, as will become apparent from the following description, if desired, the chamber 3' could also be utilized for locating switching means therein.

Figure 5:
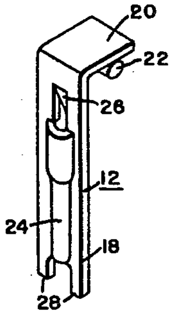
FIG. 5 is a perspective view of one terminal constructed in accordance with the principles of our invention.
Figure 6:
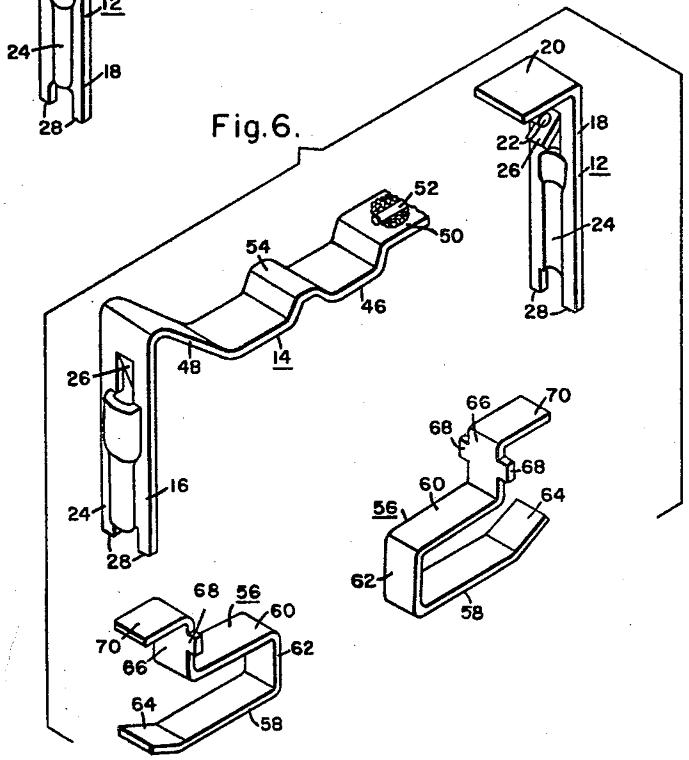
FIG. 6 is an exploded perspective view of the screwless terminals and wire clamps utilized in the wiring device as shown in FIG. 1.

Referring to FIGS. 5 and 6, the switching means located in the chamber 3 includes a generally L-shaped stationary terminal 12 having an elongated upwardly extending leg 18 with a short arm 20 extending transversely therefrom at its upper end. A stationary switch contact 22, which may be formed from any suitable non-arcing contact material, such as a silver alloy contact material, is secured to the undersurface of the arm 20 by any suitable means, such as by being brazed or welded thereto. Although the contact 22 may be of various forms, a circular form is preferable in that it may be easily fabricated from commercially available alloy wire, whereby the switching advantages of such a metal can be obtained at relatively low cost, and whereby special forming operations of the contact 22 are eliminated. The leg 18 of the terminal 12 is also provided with a central, vertically extending approximately half circular formed guide channel 24 which extends outwardly from the leg 18 in a direction opposite to the leg 20 and which is transversely enlarged at its upper end. It will be noted that the upper edge of the wire guide 24 is located a substantial distance below the arm 20 whereby the portion of the leg 18 between the wire guide 24 and the arm 20 may be formed into a projection 26 which extends angularly downward below the under surface of the arm 20 and outwardly from the leg 18. The lower edge of the leg 18 is provided with a pair of integral downwardly extending spaced tabs 28 on each side of the wire guide 24 for securing the terminal 12 within the housing 2, as hereinafter described.

Returning again to chamber 3, the inner surface of each end wall 8 is provided with a vertically elongated, longitudinally extending recess 32 which is formed to receive the guide 24 therein. A vertically elongated notch 34 is also provided in the barriers 10 and the side walls 6 at each side of each offset 32 which extends transversely to the recess 32 so as to form a pair of opposed notches for supporting the sides of the leg 18 of the terminal 12 adjacent each side of the guide 24. The notches 34 terminate at their lowermost edges into a recessed opening 42 in the base 4 which is provided with transversely opposed outwardly extending sloping surfaces 44. It will thus be apparent that the terminal 12 may easily be located within the housing 2 by being located in alignment with the recess 32 and the notches 34 and then sliding the terminal 12 downwardly therein until the lower edge of the guide 24 is seated against the upper inner edge of the base 4 and the legs 28 thereof extend through the opening 42. Thereafter, in order to secure terminal 12 to housing 2 the legs 28 are forced outwardly into engagement with the outwardly sloping surfaces 44 of housing 2 by any suitable deforming process.

Referring again to FIG. 6, it will be noted that the terminal 12 is cooperable with another terminal 14 which has an upwardly extending leg 16 which is formed in the same manner as leg 18 of terminal 12 as previously described and, accordingly, like parts have been given the same reference numerals. Also, as each end of the chamber 3 is formed in the same manner, it will be obvious that the leg 16 may be located and secured within the housing 2 in the same manner as the leg 18 of the terminal 12. The terminal 14 differs substantially from the terminal 12 in that it is provided adjacent its upper end with a long transversely extending formed arm 46 which, when the terminals 12 and 14 are properly located within the housing 2, extends below the arm 20 of the terminal 12. As shown, one end of the arm 46 is integrally joined to the upper end of the leg 16 by means of an extension 48 which extends downwardly and angularly away from the upper edge of the leg 16, while the other end of the arm 46 is provided with a longitudinally extending flat portion for carrying a contact 52 thereon. The contact 52 is identical to the contact 22 previously described; however, it is secured to the flat portion 50 of the arm 46 so that it is at substantially right angles to the contact 22 on the arm 20. In order to control the engagement of contact 52 with contact 22 the central portion of the arm 46 is provided with an upwardly extending portion 54, for purposes more completely described hereinafter. As the terminals 12 and 14 are current carrying members they are formed from a suitable electrical conducting material, such as a Phosphor bronze alloy, which may also be readily formed and utilized as indicated.

As also shown in FIG. 6 a pair of separate identical wire clamps 56 are provided which are cooperable with the terminals 12 and 14 as more fully described hereinafter. The wire clamps 56 may be made from any suitable material having sufficient resiliency, such as spring steel, and preferably having a hardness greater than that of conducting wires adapted to be connected to this device, and if desired may be provided with a suitable corrosion resistant surface, such as a cadmium plated surface. The wire clamps 56 comprise a pair of spaced extending arms 58 and 60 which are joined together at one of their ends by means of a bight portion 62, whereby the arms 58 and 60 in conjunction with the bight portion 62 form a generally U-shaped portion. The free end 64 of the arm 58 is bent angularly upwardly toward the arm 60. It will be noted that the upper arm 60 of the wire clamp 56 is sloped slightly upwardly and away from the arm 58 so that the free end of arm 60 is spaced further from the arm 58 than at the bight portion 62. The outer end of the arm 60 is provided with a vertically extending portion 66 having a transversely extending integral tab 68 for securing purposes at each of its sides. Further, the upper edge of the vertically extending portion 66 is provided with an outwardly substantially horizontal extending projection 70 having its free edge substantially in vertical alignment with the free edge of the projection 64.

Figure 3:
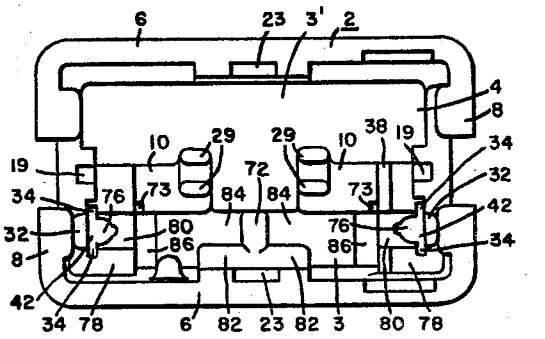
FIG. 3 is a top plan view of the base of the wiring device as shown in FIG. 1.

Referring to FIGS. 1 and 3, it will be noted that housing 2 is provided with an upwardly extending barrier 72 on substantially the lateral center line of the chamber 3 and that each barrier 10 is provided with a vertically extending slot 73 which is open at its top end towards the chamber 3 and which extends downwardly from the upper edge of the barrier 10. Thus the wire clamps 56 may easily be located within the chamber 3 by merely being inserted from the open side of the housing 2 so that a clamp 56 is located at each side of the barrier 72, as described hereinafter.

In order that the terminals 12 and 14 are readily electrically accessible from the outside of the housing 2, a pair of substantially longitudinally aligned semi-circular openings 76 are provided in base 4 of housing 2 which are joined to openings 42, respectively, so that the flat sides of the semi-circular openings 76 are substantially in alignment with the opposed inner surfaces of the terminals 12 and 14. The side wall 6 of the housing 2 adjacent each opening 76 is provided with an inwardly and downwardly sloping portion 78 which joins the base 4 at a point spaced from the barrier 10 so as to form a slot 80 in conjunction with the adjacent side of the barrier 10 of a size to guide and receive the free end of arm 58 therein. Similarly, the same side wall 6 at each side of the barrier 72 is provided with a sloping portion 82 which forms a slot 84 for guiding and receiving the bight portion 62 and the adjacent portion of the arm 58 therein. Further, in order to permit the arms 58 to be deflected, as desired, a pair of longitudinally spaced openings 86 are provided between the openings 76 so as to be adjacent to the arms 58, respectively.

By this construction the wire clamps 56 and the terminals 12 and 14 may quickly and easily be separately inserted into the housing 2 so as to form a screwless terminal arrangement. Inasmuch as the arm 46 of the terminal 14 extends longitudinally inwardly above the wire clamps 56, it is obvious that in assembling such a switch the wire clamps 56 must initially be placed within the housing 2. In so inserting the wire clamps 56 within housing 2, it will be noted that the bight portions 62 thereof engage the opposed vertically extending surfaces on the barrier 72 so as to support the wire clamps 56 against longitudinal displacement inwardly of the chamber 3, and so that the arms 58 and 60 of each clamp 56 extend in longitudinally opposite directions. When so inserted the arm 58 of each wire clamp 56 is located within its cooperable slots 80 and 84 so that the ends 64 extend upwardly adjacent the wire guide 24 of the adjacent terminal 12 or 14, and are located immediately above the openings 76 in the base 4 of housing 2, respectively. It will also be noted that the tabs 68 which extend toward barriers 10 are located within the slots 73 in the adjacent barrier 10, so as to locate and secure the upper arm 60 of the wire clamp 56 and prevent the clamp 56 from rotating within the housing 2 about an axis transverse to the sidewalls 6. Thereafter, the terminals 12 and 14 may be located as has been previously described. As shown the arm 46 of the terminal 16 extends below the arm 20 of terminal 12 and, accordingly, the terminal 14 is inserted from the open side of housing 2 prior to the insertion of terminal 12. The terminal 14 is also constructed of a suitable material, such as has been indicated, having sufficient resiliency so that the arm 46 thereof is normally biased upwardly, whereby the contact 52 normally engages the contact 22. When the terminals 12 and 14 are so inserted, the projection 26 thereof engages the upper surface of the projection 70 of its respective cooperable wire clamps 56, so as to bias the upper arm 60 of the wire clamp 56 downwardly toward the lower arm 58 thereof. Such an arrangement prevents the wire clamps 56 from being upwardly displaced with relation to the terminals 12 and 14 when a conductor is inserted, as hereinafter described.

When terminals 12 and 14 and wire clamps 56 have been so assembled electrical connections may quickly and easily be made thereto by inserting a bare electrical conductor through either of the openings 76 in the base 4 of the housing 2 so that the conductor enters the lower portion of the wire guide 24 of either of the terminals 12 and 14. Thereafter, additional upward force exerted on the conductor will cause the conductor to force the projection 64 of the adjacent wire clamp 56 slightly upwardly so that the conductor may be forced upwardly within the wire guide 24. When the wire clamp 56 is thus deflected, a resulting force is exerted by the wire clamp 56 upon the inserted conductor by the resilient arm 58 thereof, which provides a contact pressure between the conductor and the terminal 12 or 14 which is adequate to ensure proper electrical contact. When a force in the opposite direction is applied in attempting to remove the wire from the device an increasing force between the conductor and the wire clamp 56 results which causes the upper sharp edge of the projection 64 of the wire clamp 56 to bite into the softer electrical conductor and to prevent the conductor from being withdrawn. The greater the force applied to the wire, the greater the biting force of the projection 64 on the wire. The relative deflection of the clamps 56 with respect to the terminals 12 and 14 makes it possible to obtain such holding and gripping action on various sizes of electrical conductors without bending the arms 58 of the wire clamps 56 to a point where permanent set will occur. It will, of course, be obvious that the size of the opening 76 will limit the maximum size of the electrical conductor which can be inserted therethrough, whereby the maximum deflection of the wire clamps 56 can be determined. In order to release an inserted conductor, any suitable instrument such as a screw driver or a nail may be inserted in the adjacent release slot 86 in the base 4 of the housing 2, to push against the underside of the arm 58 of the wire clamp 56. Such action will deflect the arm 58 so that the gripping edge of the projection 64 is no longer in contact with the wire, and the wire is thus free to be removed. In addition, the configuration of the wire clamp 56 provides a stop on itself which prevents the wire clamps from being overstressed upon releasing the wire. Thus, it will be noted that the lower edge between the arm 60 and the portion 66 will be engaged by the projection 64 of the arm 58 so as to limit the upward deflection of the arm 58. By proper design of the location of the clamp 56, the distance the arm 58 may readily deflect can be limited so that overstressing of the arm 58 of the clamps 56 may be prevented.

As shown the open top of the housing 2 is adapted to be completely closed by means of a yoke 88. The yoke 88 may be fabricated from any suitable material having sufficient structural strength, such as sheet steel, and is provided with an arm 90 at each of its ends which extend longitudinally outward of the housing 2. The arms 90 are provided with suitable means, such as punched out threaded openings 92, for securing the switch assembly to suitable supporting means, such as an outlet box. The yoke 88 is also provided at each end with a pair of downwardly extending fastening lugs 94 which engage the outer surface of the side walls 6. The lugs 94 are bendable laterally into engagement iwth laterally extending shoulders at opposite sides of the formed opening 96 which is formed in each end of the housing 2, whereby the yoke 88 is secured to the housing 2. For a more complete description of the lugs 94 and opening 96, reference may be made herein to U.S. Patent 2,881,279, filed by O. L. Taylor on April 12, 1954, entitled Wiring Device, and assigned to the same assignee as this invention.

If desired, in order to provide electrical insulation between the yoke 88 and the terminals 12 and 14, a suitable insulator plate 98 may be provided between the yoke 88 and the housing 2 above the contacts 22 and 52. Further, if desired, the upper edges of the side walls 6 and the adjacent end wall 8 may be recessed inwardly to receive the insulator plate 98. The insulator plate 98 may be formed from any suitable insulating material such as a phenolic sheet. The yoke 88 is also provided with a longitudinally extending elongated rectangular opening 100, having its center in substantially the longitudinal and lateral center lines of the yoke 88, for receiving an operating member 40. The yoke 88 is further provided with an integral upwardly extending semi-circular pivot guide portion 5 at each side thereof having their centers on the lateral center line of the yoke 88 for pivotally supporting the operating member 40.

Figure 2:
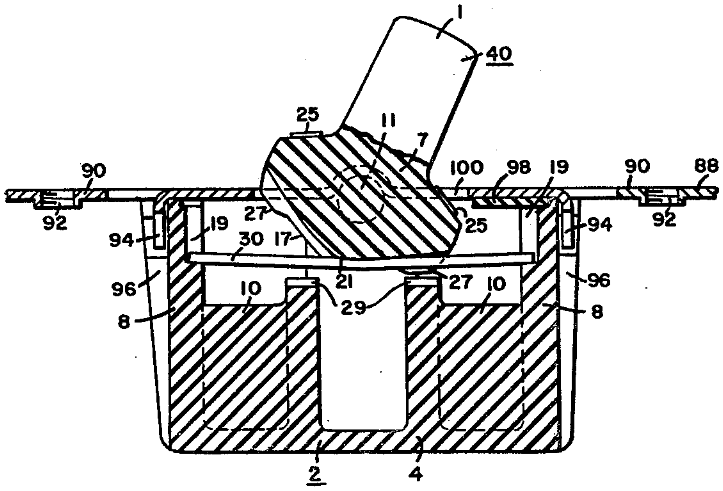
FIG. 2 is a longitudinal cross-sectional view of the wiring device shown in FIG. 1 taken substantially on the longitudinal center line thereof.

The operating member 40 is irregular in form and is preferably fabricated from a suitable insulating material, such as a molded plastic material, which may readily be formed as hereinafter described. As shown in FIGS. 1 and 2 the operating member 40 comprises an elongated main body portion 7 which is adapted to be located within the opening 100 of the yoke 88. The body portion 7 is provided with integrally formed supports 9 at each of its sides which extend laterally outwardly therefrom and are provided with circularly formed ends 11. The supports 9 are substantially of equal length and each extends a distance so as to be engageable with the adjacent side wall 6. As shown in FIG. 3, each side wall 6 is provided with a central semi-circular recess 23 which is inwardly open toward chambers 3 and 3' for receiving the lower half of the outer end 11 of its cooperating support 9. Inasmuch as the recesses 23 support only the lower half of the ends 11, the upper halves thereof extend upwardly above the side walls 6 of the housing 2. As previously described, the yoke 88 is provided with pivot guide portions 5 which receive the upper portion of the supports 9. Thus, when the outer ends 11 of the supports 9 are located in the recesses 23 and the yoke 88 thereafter is secured to the housing 2, the operating member 40 is pivotally supported by its outer ends 11. If desired the entire upper surface 13 of each support 9 may be provided with the same curvature as the outer ends 11 so as to be guided by the inner surface of the guide portions 5 when the operating member 40 is rotated. It will be realized that only the outer ends 11 of the supports 9 are necessary to pivotally support the operating member 40 and that, if desired, the engaging portion of the surface 13 of the supports 9 and the guide portions 5 between the body portion 7 and each end 11 may be eliminated.

As shown in FIG. 2, each end wall 8 of the housing 2 is provided with a central open-sided slot 19 which extends downwardly from the upper surface thereof so as to form a pair of longitudinally opposed slots on substantially the longitudinal center line of the housing 2. A spring 30, which may be of any suitable material having sufficient resiliency, such as spring steel, and which is preferably circular in cross section, is insertable from the top of the housing 2 so that it extends longitudinally between the slots 19 and so that its ends are supported by the bottoms thereof, respectively.

It will be noted that the lower part of the body portion 7 of the operating member 40, which projects inwardly of the housing 2 toward the spring 30, is formed in a longitudinally extending broad V-shape, having a generally V-shaped central longitudinally extending, substantially semi-circular cross-sectioned groove 17 therein. In order to obtain a toggle action for the operating member 40, the groove 17 is located on the body portion 7 so that when the operating member 40 is at either of its extreme positions, spring 30 lies in one of the arms of the V-shaped groove 17. As hereinafter described, the spring 30 is slidably cooperable with the bottom surface of each arm of the groove 17, and accordingly, the spring 30 and the groove 17 are provided with cooperable cross sections, such as the circular and semi-circular cross sections, respectively, previously described. If desired, other cooperable cross sections could be employed without affecting the operation of the spring 30 and the groove 17.

As the spring 30 is located in one arm of the groove 17 at the right as viewed in FIG. 2, it will be noted that movement of the operating member 40 from this extreme position counterclockwise towards the other extreme position at the left will cause the apex 21 of the groove 17 between each of its arms to engage the central portion of the spring 30 and deflect it downwardly and thus stress the spring 30. The apex 21, of course, comprises the junction between the bottom surfaces of the arms of the groove 17. The force exerted by the spring 30 when it is thus stressed tends to oppose further movement of the operating member 40 as the line of action of the spring force lies to the left of the operating member's pivot axis. However, continued movement of the handle counterclockwise causes the apex 21 to reach a dead center position where it is in vertical alignment with the pivot axis of the operating member 40, and the line of action of the spring force is vertically upward and extends through the pivot axis of the operating member 40. Further counterclockwise movement of the operating member 40 causes the spring 30 to enter the other arm of the groove 17 in that this line of action of the spring force moves to the right of the pivot axis. When the spring force action is so moved to the right of the pivot axis, it will assist counterclockwise movement of the operating member 40 until the operating member 40 is in its other extreme position. As can be appreciated, it is desirable that the operating member 40 be constructed so that it cannot be stopped at its dead center position. Accordingly, the apex 21 is pointed so that the operating member 40 is unstable when the spring force passes vertically through the apex 21 and the pivot axis.

The movement of the apex 21 over the spring 30 will be primarily provided with a rounded contour. It will also be noted that when the spring 30 engages the upper surface of one arm of the groove 17 at either extreme position, it is slightly deflected to bias the operating member 40 upwardly into engagement with the yoke 88 at all times and hold the operating member 40 at such extreme position. It will be noted that the bottom surface of each arm of groove 17 is slightly curved upwardly toward its end of body portion 7 on a radius larger than that of each point on the bottom surface of the groove 17 to the pivot point of the operating member 40, i.e. the ends 11 thereof. Obviously, the center of the circle which defines the curvature of the arms of the groove 17 is not located on the line defined by the pivot point of the body member 40 and the apex 21. By such construction, as the operating member moves past the dead center point of the spring 30, the other arm of the groove 17 progressively engages the spring along the curvature of the arm. Such construction provides, in effect, a resilient stop to gradually decelerate the operating member 40, and since at either end of its movement there is no sudden engagement of the spring with the groove 17, the operation of the switch is quiet.

As is customary, an integral handle portion 1 is provided which extends upwardly from the main body 7 of the operating member for pivotally moving the body portion 7 from one extreme position to another. If desired, markings 25 may be located on the upper surfaces of the body portion 7 adjacent the handle portion 1 to indicate the position of the switch contacts 52 and 22 with respect to each other. Further, the body portion 7, adjacent the outer end of each arm of the groove 17 at each side thereof, may be provided with a downwardly extending projection 27 to provide an overtravel stop in conjunction with upwardly extending stops 29 on the inner end of each barrier 10. Thus, any excessive force applied to the operating member 40 in either direction will cause the projections 27 to engage the stops 29 whereby the spring 30 cannot be overstressed because the operating member 40 will then directly engage one of the barriers 10.

Figure 4:
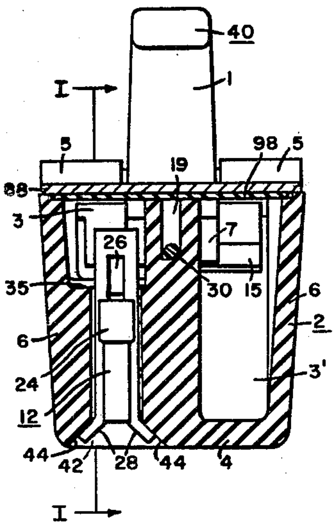
FIG. 4 is a lateral cross-sectional view of the wiring device shown in FIG. 1 taken substantially along the line IV—IV thereof.

As shown in FIG. 4, the portion of each support 9 between its end 11 and the body portion 7 is provided with an integral cam 15 which projects downwardly into chambers 3 and 3′ of housing 2. If no switch components are located in chamber 3′, the cam 15 on such side of body portion 7 may be eliminated; however, it will be appreciated by so providing both cams 15 a single operating member 40 may be utilized for both single and double pole types of switch construction (reversible handle). The lower surface of each cam 15 is located and formed so that when the operating member 40 is pivotally rotated in a counterclockwise direction, with reference to FIG. 1, the lower edge of the cam 15 engages the upper side of the projection 54 on the arm 46 of the terminal 14, whereby the arm 46 is forced downwardly from the arm 20 of the terminal 12, and the contacts 52 and 27 are separated. In order to retain the projection 54 in the depressed or off position, the cam 15 is provided at its inner end with an extended surface 31 which engages the projection 54 at all times that the cam 15 is so rotated counterclockwise. Conversely, in order to establish contact between the contacts 52 and 22, the operating member 40 is pivotally moved by the handle 1 in a clockwise direction, whereby the surface 31 of the cam 15 is moved away from the projection 54 and the resiliency of the arm 46 causes the contact 52 to move upwardly into engagement with the contact 22.

By this construction it will be noted that we have primarily provided a switch which is quiet in operation and which may easily be constructed by merely inserting various components parts thereof from the open side of the housing, which parts do not require any separate means for securing them together or to the housing 2. Further, the means for properly locating the component parts of the switch within the housing 2, such as the slots 15, the notches 34, the barrier 72, etc., may all be easily provided during molding of the casing. As the contacts 22 and 52 are crossed, the alignment thereof is not critical within a wide range of spacings of the ends 8 of the housing 2, and they have essentially point contact when engaged. Also, the terminals 12 and 14, the yoke 88 and the wire clamps 56 are all of a form which are suited for forming by simple manufacturing processes.

Having described a preferred embodiment in accordance with the patent statutes, it is desired that the invention be not limited to the specific construction shown and described inasmuch as it is apparent that modifications thereof may be made without departing from the broad spirit and scope of our invention. Accordingly, it is desired that the invention be interpreted as broadly as possible and that it be limited only as required by prior art.

We claim as our invention:

1. A wiring device comprising an insulating support having at least two walls at an angle to each other, a terminal secured to said support adjacent the inner surface of one wall of said support, a generally U-shaped spring adapted to be separately mounted on said support and having one arm thereof located in engagement with the inner surface of the other wall of said support and with both arms extending toward said terminal, the other arm of said spring being formed adjacent its outer end, with a short lateral outward extension which terminates in a short lateral projection, the free end of said one arm and said projection being located in substantial alignment adjacent to but spaced from said terminal and with said projection located substantially parallel to said one arm, an opening in said other wall of said support between said one arm of said spring and said terminal whereby an electrical conductor may be inserted therebetween in one direction along a surface of said terminal, and means integral with said terminal extending outwardly therefrom in engagement with the outer surface of said projection to force said arms of said spring toward each other and to prevent said spring from being longitudinally displaced with relation to said terminal when said conductor is so inserted.

2. A wiring device comprising a cup-shaped insulating support, a generally U-shaped spring, said support having a chamber therein for receiving said spring therein with one arm in engagement with the base of said support and with both arms extending toward and spaced from one side wall of said support, said chamber being open toward the open side of said support whereby said spring may be separately and slidably inserted from said open side, an elongated flat terminal having an integral projection extending outwardly therefrom, said terminal being also adapted to be separately inserted longitudinally through the open side of said support along said one side wall to a position where said projection engages the outer surface of the outermost arm of said spring to force the arms thereof toward each other and to prevent longitudinally upward displacement therebetween, and means for securing said terminal to the base of said support at the aforesaid position thereof.

3. A wiring device comprising a cup-shaped insulating support, a generally U-shaped spring, guide means integral with said support extending outwardly toward the open side of said support for separately receiving said spring therein from the open side of said support and supporting it laterally with the free end of each arm of the spring being spaced from the inner surface of one side wall of said support, a terminal adapted to be located adjacent said inner surface of said support, guide means formed integrally with said support extending inwardly from the open side of said support for separately and slidably receiving said terminal and locating it in place laterally, means for securing said terminal in place in said support, an opening in the base of said support between the free end of the arm of said spring adjacent the base and said terminal and means integral with said terminal engaging an outer portion of the other arm of said spring to prevent movement of said spring back out the open side of said support, whereby said spring will be resiliently deflected by engagement of an inserted conductor with said one spring arm to hold said conductor in engagement with said terminal .

4. A wiring device comprising a cup-shaped insulating support, a terminal adapted to be located adjacent the inner surface of one side of said support, guide means formed integrally with said support extending inwardly from the open side of said support for slidably receiving said terminal and locating it in place laterally, means for securing said terminal in place in said support, a generally U-shaped spring, guide means integral with said support extending outwardly toward the open side of said support for receiving said spring therein from the open side of said support and supporting it laterally with the free end of each arm of the spring being spaced from said terminal and with one arm of the spring engaging the base of said support, an opening in the base of said support between the free end of said one arm of said spring and said terminal, the aforesaid guide means for said spring including interfitting projection and recess means on said support and the other arm of the spring, and means integral with said terminal engaging an outer portion of the other arm of said spring to prevent movement of said spring back out the open side of said support, whereby said spring will be resiliently deflected by engagement of inserted conductors with said one spring arm to hold said conductors in engagement with said terminal.

5. A wiring device comprising a cup-shaped insulating support, a generally U-shaped spring, guide means integral with said support extending outwardly toward the open side of said support for separately receiving said spring therein from the open side of said support and supporting it laterally with the free end of each arm of the spring being spaced from a terminal and with one arm of the spring engaging the base of said support, said terminal adapted to be located adjacent the inner surface of one side of said support, guide means formed integrally with said support extending inwardly from the open side of said support for separately and slidably receiving said terminal and locating it in place laterally, means for securing said terminal to the base of said support, an opening in the base of said support between the free end of said one arm of said spring and said terminal, and tab means integral with said terminal projecting inwardly of said support open side and engaging an outer portion of the other arm of said spring to prevent movement of said spring back out the open side of said support, whereby said spring will be resiliently deflected by engagement of inserted conductors with said one spring arm to hold said conductors in engagement with said terminal.

6. A wiring device comprising a cup-shaped insulating support, a generally U-shaped spring, said support having a chamber therein for separately receiving said spring therein with one arm in engagement with the base of said support and with both arms extending toward and spaced from one side wall of said support, said chamber being exposed to the open side of said support whereby said spring may be separately and slidably inserted from said open side, an elongated flat terminal having an integral portion extending laterally from one end thereof, said terminal being also adapted to be separately inserted longitudinally through the open side of said support along said one wall to a position where the laterally extending portion thereof is located between the open side of said support and the outermost arm of said spring, means fixedly mounting said terminal in said support at the aforesaid position thereof and means between said terminal and said outermost arm of said spring reacting to prevent bodily movement of said spring toward the open side of said support.

7. A wiring device comprising a cup-shaped insulating support, a terminal adapted to be located adjacent the inner surface of one side of said support, guide means formed integrally with said support extending inwardly from the open side of said support for slidably receiving said terminal and locating it in place laterally, means for securing said terminal in place in said support, a generally U-shaped spring, guide means integral with said support extending outwardly toward the open side of said support for receiving said spring therein from the open side of said support and supporting it laterally with the free end of each arm of the spring being spaced from said terminal and with at least a portion of one arm of the spring engaging the base of said support, an opening in the base of said support between the free end of said one arm of said spring and said terminal, the aforesaid guide means for said spring including interfitting projection and recess means on said support and the other arm of the spring, and means between said terminal and an outer portion of the other arm of said spring reacting to prevent bodily movement of said spring toward the open side of said support, whereby said spring will be resiliently deflected by engagement of inserted conductors with said one spring arm to hold said conductors in engagement with said terminal.

8. A wiring device comprising, a cup-shaped insulating support, a generally U-shaped spring, said support having a chamber therein for separately receiving said spring therein with one arm in engagement with the base of said support and with both arms extending toward and spaced from one side wall of said support, said chamber being exposed to the open side of said support whereby said spring may be separately and slidably inserted into said support from said open side, guide means for said spring including interfitting projection and recess means on said support and the outermost arm of said spring, an elongated flat terminal having an integral portion extending laterally from one end thereof, said terminal being also adapted to be separately inserted longitudinally through the open side of said support along said one wall to a position where the laterally extending portion thereof is located between the open side of said support and said outermost arm of said spring, means for fixedly mounting said terminal in said support at the aforesaid position thereof and means between said terminal and said outermost arm of said spring reacting to prevent bodily movement of said spring toward the open side of said support.

9. A wiring device comprising a cup-shaped insulating support, a terminal adapted to be located adjacent the inner surface of one side of said support, guide means formed integrally with said support extending inwardly from the open side of said support for slidably receiving said terminal and locating it in place laterally, means for securing said terminal in place in said support, a generally U-shaped spring, guide means integral with said support extending outwardly toward the open side of said support for receiving said spring therein from the open side of said support and supporting it laterally with the free end of each arm of said spring being spaced from said terminal, an opening in the base of said support between the free end of the arm of said spring adjacent the base and said terminal, the aforesaid guide means for said spring including interfitting projection and recess means on said support and the other arm of said spring, said terminal having a laterally extending portion located between the other arm of said spring and the open side of said support, and means engaging said terminal and an outer portion of the other arm of said spring and preventing bodily movement of said spring toward the open side of said support, whereby said spring will be resiliently deflected by engagement of an inserted conductor with said one spring arm to hold said conductor in engagement with said terminal.

10. A wiring device comprising a cup-shaped insulating support, an open sided chamber in said support having its open side facing the open side of said support, a generally U-shaped spring located in said chamber with at least a portion of the bight thereof engaging one side wall of said chamber and with the arms of said spring extending toward but spaced from another wall of said chamber located opposite said one wall, whereby said spring may be separately inserted into said chamber from the open side of said support, guide means for said spring including interfitting projection and recess means on said support and one arm of said spring, a terminal located in said chamber adjacent said other wall thereof and having an outwardly extending portion located between said spring and the open side of said support, whereby said terminal may also be separately located on the aforesaid position by inserting it into said support from the open side thereof, means for fixedly mounting said terminal in the aforesaid position, means between said terminal and said spring reacting to prevent bodily movement of said spring toward the open side of said support, and an opening in said support between one arm of said spring and said terminal whereby said spring will be resiliently deflected by engagement of an inserted conductor with said one spring arm to hold said conductor in engagement with said terminal.

References Cited in the file of this patent

UNITED STATES PATENTS

| | | |
|---|---|---|
| 2,626,335 | Landin | Jan. 20, 1953 |
| 2,640,970 | Falge et al. | June 2, 1953 |
| 2,705,785 | Benander | Apr. 5, 1955 |
| 2,713,668 | Gibilisco | July 19, 1955 |
| 2,720,634 | Hart | Oct. 11, 1955 |
| 2,738,482 | Benander | Mar. 13, 1956 |
| 2,841,673 | Benander | July 1, 1958 |
| 2,868,929 | Koenig | Jan. 13, 1959 |